No. 711,020. Patented Oct. 14, 1902.
C. A. TATUM.
WATER COOLER.
(Application filed Aug. 1, 1902.)
(No Model.)
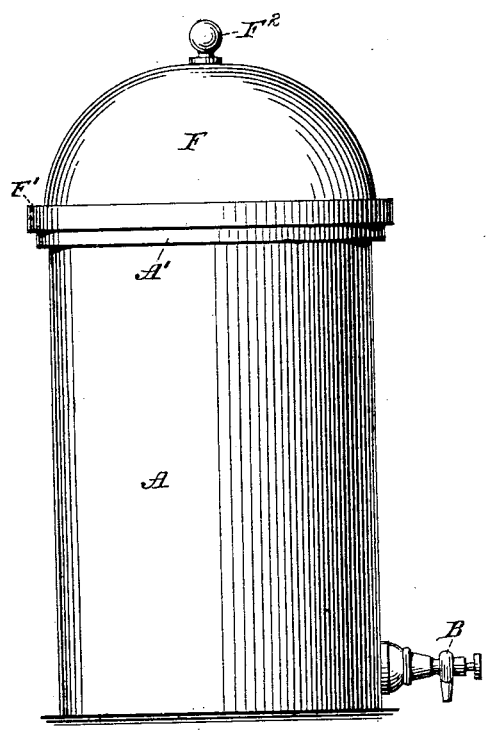
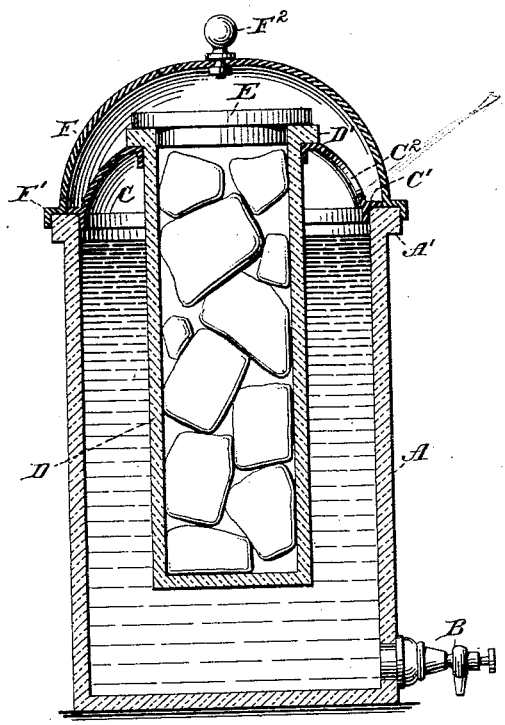
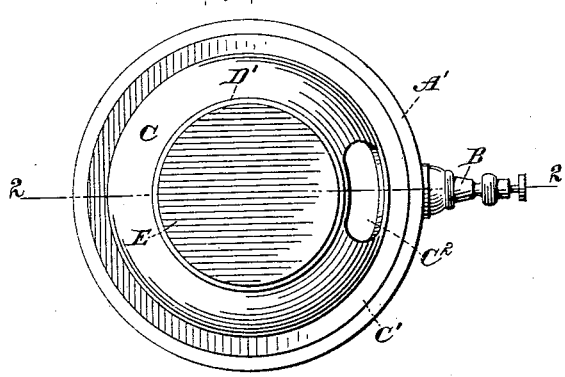
WITNESSES:
INVENTOR
Charles A. Tatum
BY
ATTORNEYS

UNITED STATES PATENT OFFICE.

CHARLES A. TATUM, OF NEW YORK, N. Y., ASSIGNOR TO WHITALL TATUM COMPANY, OF BOROUGH OF MANHATTAN, NEW YORK, N. Y., A CORPORATION OF NEW JERSEY.

WATER-COOLER.

SPECIFICATION forming part of Letters Patent No. 711,020, dated October 14, 1902.

Application filed August 1, 1902. Serial No. 117,937. (No model.)

*To all whom it may concern:*

Be it known that I, CHARLES A. TATUM, a citizen of the United States, residing in the borough of Manhattan, city, county, and State of New York, have invented certain new and useful Improvements in Water-Coolers, of which the following is a specification.

The object of my invention is to provide a water-cooler which will be strong and durable and which will keep the water in proper cool condition without any danger of contamination by dust or other foreign matter.

To this end my invention consists in certain features of construction, as will be fully described hereinafter and particularly pointed out in the appended claims.

Reference is to be had to the accompanying drawings, in which—

Figure 1 is an outside view of my improved water-cooler. Fig. 2 is a central sectional elevation thereof on the line 2 2 of Fig. 3, and Fig. 3 is a plan with the outside cover removed.

The improved cooler comprises an outer receptacle A, generally made of glass and provided with a thickened rim A' at its upper edge. At its lower portion the receptacle A has a cock or faucet B, which may be of any suitable construction. Upon the inner edge of the rim A' is adapted to rest the inner cover C, which for this purpose is provided with a flange C'. The upper end of the cover C is made with a central aperture and with a seat adapted to receive the ice-receptacle D, which has a flange D' at its upper end to support it upon the seat of the inner cover C. This ice-receptacle also is generally made of glass. The size of the ice-receptacle is such that it cannot touch the bottom of the outer receptacle A, thus preventing a breakage of the inner receptacle by contact with the outer one. In order that the water contained in the outer receptacle may not float the ice-receptacle, a weight E may be placed on top of the ice-receptacle, and this weight, as also shown, will serve as a cover for the ice-receptacle. In order that the outer receptacle may be filled with water without removing either the ice-receptacle or the inner cover, the latter is provided with an aperture $C^2$, preferably of elongated shape, so that water may be poured directly into the annular space between the two receptacles A and B. It will be observed that the aperture $C^2$ is located at a lower level than the open upper end of the ice-receptacle, and thus the accidental introduction of ice into the water-receptacle is rendered very improbable.

In order that no dust or other foreign matter may enter the apparatus through the opening $C^2$, I have provided an outer cover F, having a bottom flange F', which fits on the outer portion of the rim A', against the outer edge of the flange C', if desired. The outer cover may be provided with a handle $F^2$.

Modifications of my invention as long as they remain within the scope of the appended claims will constitute no departure from the nature of my invention.

The apparatus may be used for cooling beverages and liquids other than water.

What I claim as new, and desire to secure by Letters Patent, is—

1. A cooler, comprising an outer receptacle for the liquid, an inner cover arranged to rest on the upper edge of said receptacle and having a central opening, and also having a lateral opening below said central opening to allow the said receptacle to be filled with water, an ice-receptacle supported on said inner cover at the central opening thereof, a cover for weighting and closing the top of the ice-receptacle, and an outside cover which rests on the upper edge of the first-named receptacle exteriorly of the inner cover.

2. A cooler, comprising an outer receptacle adapted to receive the liquid, an inner cover supported on said receptacle and provided with a central opening and also with a lateral opening, an ice-receptacle supported on said inside cover at the central opening thereof, and an outside cover surrounding the inside cover and the upper end of the ice-receptacle.

3. A cooler, comprising a liquid-receptacle, an inside cover resting on the inner portion of the upper edge of said receptacle, and provided with a central top aperture and also with a lateral opening at a lower level, an ice-receptacle suspended within the liquid-receptacle and resting on the said inner cover, and an outside cover resting on the upper edge of the liquid-receptacle.

In testimony whereof I have signed my name to this specification in the presence of the two subscribing witnesses.

CHARLES A. TATUM.

Witnesses:
 A. H. TATUM,
 EUGENE EBLE.